United States Patent [19]

Bergman

[11] 3,868,646

[45] Feb. 25, 1975

[54] MEMORY DEVICE WITH STANDBY MEMORY ELEMENTS

[75] Inventor: Ruben Gustav Bergman, Alvsjo, Sweden

[73] Assignee: Telefonaktiebolaget L. M. Ericsson, Stockholm, Sweden

[22] Filed: May 4, 1973

[21] Appl. No.: 357,118

[30] Foreign Application Priority Data

June 9, 1972 Sweden .............................. 7605/72

[52] U.S. Cl. .............................................. 340/172.5

[51] Int. Cl...... G06f 11/00, G11c 7/00, G11c 13/00

[58] Field of Search......................... 340/172.5, 174; 235/153 AE

[56] References Cited

UNITED STATES PATENTS

| | | | |
|---|---|---|---|
| 3,303,474 | 2/1967 | Moore et al. | 340/172.5 |
| 3,377,623 | 4/1968 | Reut et al. | 340/172.5 |
| 3,422,402 | 1/1969 | Sakalay | 340/172.5 |
| 3,444,528 | 5/1965 | Lovell et al. | 340/172.5 |
| 3,541,525 | 11/1970 | Ganze | 340/172.5 |
| 3,541,529 | 11/1970 | Nelson | 340/172.5 |
| 3,562,716 | 2/1971 | Fontaine | 340/172.5 |
| 3,623,014 | 11/1971 | Doelz et al. | 340/172.5 |
| 3,633,175 | 1/1972 | Harper | 340/172.5 |
| 3,636,331 | 1/1972 | Amrehn | 340/172.5 |

*Primary Examiner*—Gareth D. Shaw
*Assistant Examiner*—Paul R. Woods
*Attorney, Agent, or Firm*—Hane, Baxley & Spiecens

[57] ABSTRACT

Between the memory and the word register of a computer are interposed switching means to permit the recording into or reading out of supplementary memory elements which are used whenever a normal memory element associated with word groups in the memory becomes faulty so that the memory can still be used while repairs are being performed.

5 Claims, 1 Drawing Figure

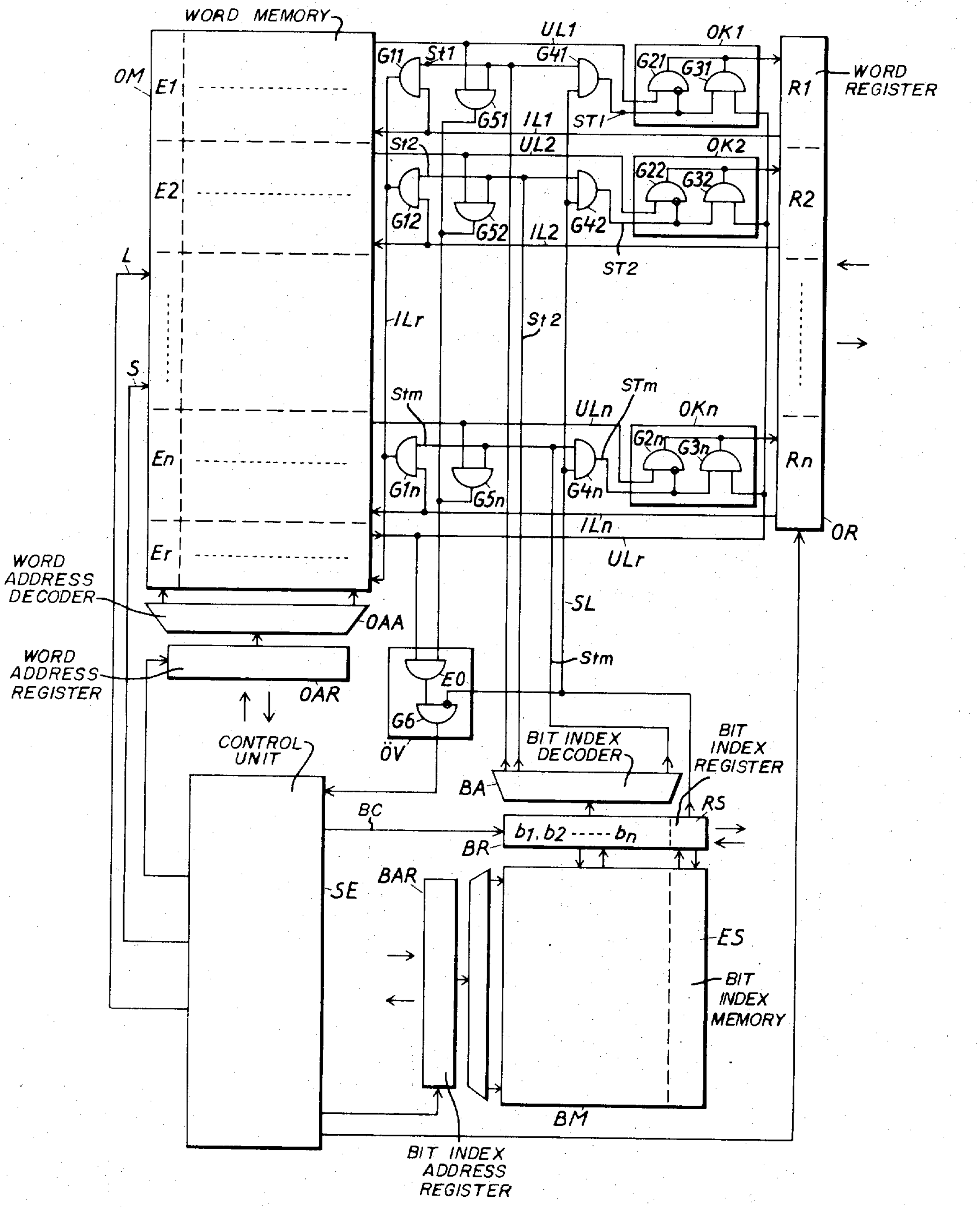
WORD MEMORY
OM
E1
E2
En
Er
L
S
G11
St1
G41
UL1
OK1
G21
G31
R1
WORD REGISTER
G51
IL1
ST1
St2
UL2
OK2
G22
G32
G12
G52
IL2
G42
R2
ST2
ILr
St2
Stm
STm
ULn
OKn
G2n
G3n
Rn
G1n
G5n
G4n
ILn
ULr
OR
WORD ADDRESS DECODER
OAA
SL
WORD ADDRESS REGISTER
OAR
Stm
EO
G6
ÖV
CONTROL UNIT
BIT INDEX DECODER
BIT INDEX REGISTER
BA
RS
BC
b1, b2 ----- bn
BR
BAR
SE
ES
BIT INDEX MEMORY
BM
BIT INDEX ADDRESS REGISTER

MEMORY DEVICE WITH STANDBY MEMORY ELEMENTS

The present invention relates to a memory device used in a computer and containing a word memory with memory elements arranged in groups, each group being designed for storage of digital words which consist of binary bits, and the elements in each group and the binary bits of the words being defined by their respective bit indexes. The memory device also includes a word register in which digital words are registered by a control unit of the computer, the bits of the words being transferred between the word register and the word memory, and vice versa, on their respective input wires and output wires in conjunction with writing and reading from the word memory. In addition, there is a word address register in which, by the control unit of the computer, a word address is registered, under which a digital word is written and read, respectively, into and from an element group in the word memory, determined by the word address.

A memory device of this kind and the principle of operation of a computer are described, for example, in the U.S. Pat. No. 3,517,174. A number of memory devices form the memory unit of the computer in which are stored instructions, data of state and temporary data concerning a system consisting of a number of interworking units, for example an automatic telephone exchange, which are to be controlled by the computer. The functions of the memory unit, for example writing and reading of digital words, are controlled by the control unit of the computer, digital words and word addresses in binary form being transferred between, for example, a number of registers in a central processing unit of the computer and word registers and address registers, respectively, of the memory devices.

Considerable economic resources are necessary in order to guarantee that the computer works without error. The above-mentioned U.S. Patent describes how reliability is achieved by means of redundancy obtained through two computers working in parallel. When an error occurring in a functional unit of one of the computers has been traced, the computers continue to work in parallel with the exception of the faulty functional unit, for example a faulty memory device, which is replaced by the service personnel as soon as possible by a new functional unit. In the unfortunate event that, during the period during which only one of the functional units is working for both computers, this unit as well should become faulty, the second fault is not discovered, that is the reliability is diminished during such period.

An object of the present invention is to avoid such periods of diminished reliability when one of the memory elements in a word memory included in one of the memory devices of the computers has been identified as faulty by means of a fault tracing programme in an otherwise known manner.

A memory device known, for example, through U.S. Pat. No. 3,633,175 achieves this by means of a standby memory, the address of the element group containing the faulty element being recoded into a standby address of one of the element groups of the standby memory, and that group thereby replaces the entire element group in previous use. If, however, the memory unit of the computer consists of so called bit-oriented semiconductor memories, there is a risk that all memory device elements whose bit index agree with the bit index of the first discovered faulty element, may be faulty so that it is impossible to avoid such period of diminished reliability through the use of a few standby element groups.

Reliability is achieved, especially when using bit-oriented memories, with a memory device according to the invention, which is defined by the appended claims and which will be explained by means of an embodiment with reference to the accompanying drawing whose sole FIGURE shows the appropriate parts of the memory device.

The drawing indicates how the parts are controlled in accordance with an otherwise known data processing technique by means of a control unit SE for microprograms described, for example, in U.S. Pat. No. 3,517,174. According to said known technique digital words consisting of binary bits and word addresses are transmitted between the central processing unit of the computer and word registers OR and word address registers OAR of the memory device, and vice versa, which is indicated on the drawing by the incoming and outgoing arrows. The word address register is connected to a word address decoder OAA and the digital words are written and read from the word memory OM of the memory device by means of addresses written in the address register OAR and decoded in the word address decoder OAA, a microprogramme indicating through activation of control circuits S and L between the control unit SE and the word memory OM that writing or reading shall take place.

Each of the registering elements R1, R2 . . Rn of the word register registers a binary bit, defined by its bit index *b*1, *b*2, . . *bn*, form a part of a digital word. For each word address the word memory OM contains a memory element group, including memory elements E1, E2 . . E*n* each for storing the associated binary bit with bit index *b*1, *b*2 . . *bn*. These bits are transferred from and to registering elements of the word register on input wires IL1, IL2 . . IL*n* and output wires UL1, UL2 . . UL*n* and via AND gates G21, G22 . . G2*n* forming part of reversing switches OK1, OK2 . . OK*n*, the function of which will be described later.

Apart from memory elements E1, E2 . . E*n*, each element group contains standby elements. The embodiment according to the drawing shows that each element group is extended by the standby element E*r* which, via a standby input wire IL*r*, is connected to writing gates G11, G12 . . G1*n* and which, via a standby output wire UL*r*, is connected to AND gates G31, G32 . . G3*n* forming part of the reversing switches. The drawing shows that, for example, writing gate G11, when in activated state, owing to a binary 1 on its control input **S*t*1, sets up writing a connection between registering element R1** and standby *er*. It is also seen that, for example, reversing switch OK1 sets up two alternative reading connections to the registering element R1. The switching function is brought about in a known manner by means of gates G21 and G31, the outputs of which are connected to the registering element R1, which is connected to the memory element E1 and to the standby element Er when, respectively, gates G21 and G31 are activated. If an inverting control input of gate G21 and a control input of gate G31 are connected to a control input ST1 of the reversing switch, the rest or working position of the reversing switch is brought about as a result of a binary 0 or 1, respectively, on said control input ST1. To the registering element R1 a binary bit is read in the rest position from the memory element E1 and in the working position from the standby element E*r*.

A memory device according to the invention also comprises a bit index register BR with a connected bit index decoder BA, the outputs of which are connected in order of bit indexes or positions to said control inputs S*t*1, S*t*2, . . . S*tn* for the respective input gates G11, G12 . . G1*n* and control inputs ST1, ST2, . . . ST*n* of reversing switches OK1, OK2 . . OK*n*. According to the drawing, blocking gates G41, G42 . . G4*n* are placed in the control circuits of reversing switches. The function of the blocking gates will be described later; until then it is assumed that they function as normally closed contacts. Like the word register OR, the bit index register BR is fed from the central processing unit of the computer, a bit index *b*1, *b*2 . . *bn* selected by the computer control unit SE being registered in binary form. This is indicated in the drawing by an arrow with incoming direction and a control circuit lead BC from the control unit SE to the bit index register BR. Every registered bit index activates one of the outputs of the bit index decoder BA, so that the binary bit in a digital word defined by the registered bit index is written both in the memory element defined by the bit index and in the standby element, but is read solely from the standby element, which thus replaces the respective memory element. If it is assumed that the registered bit index has been obtained as a result of the aforesaid fault tracing program for faulty memory elements, the memory device need not be disconnected until the service personnel have replaced the faulty word memory, that is the reliability provided by parallel operation of two computers is practically not restricted at all.

In the memory device described hitherto, owing to a bit index registered in the bit index register BR, the respective memory elements in all element groups are replaced by their respective standby elements, despite the fact that only one element group is faulty. If each element group comprises several standby elements with associated writing gates, reversing switches and bit index registers, several faults can be eliminated in the word memory OM without affecting the reliability of the computers. In such word memories, however, the number of element groups is much greater than the number of elements in each group; therefore the probability is small that a new fault in the word memory will arise within a group which already contains a faulty element. The idea of using the standby elements in a more flexible manner is based on this probability evaluation. For this purpose a bit index memory BM shown in the drawing is arranged in which, through the control unit SE of the computer, selected bit indexes are stored which are written and read, respectively, by means of said bit index register BR and a bit index address register BAR in which, through the control unit CE of the computer, a bit index address is registered synchronously with the word address registration in the word address register OAR. Two alternatives are conceivable for the relations between the word addresses of the word memory and the bit index addresses of the bit index memory. The first alternative is fixed relations, each bit index address being unchangeably allotted to its word address group, which in an extreme case would result in the same number of bit index addresses as there are word addresses. In such case one memory element may be faulty within each word memory part defined by a word address group without limitation of the reliability of the parallel working system. The second alternative is flexible address relations, the control unit SE selecting one of the bit index addresses in order to allot to it a word address which indicates a faulty element group or to allot to it a word address group, the associated element groups of which have to be supervised as will be described later. The flexibility admittedly adds to the expense of the control unit SE but, with a relatively small bit index memory BM, it is achieved that every bit index address is allotted only one word address on replacement of a faulty memory element. As is known, the contents of the two parallel-working word memories must be re-coordinated before the work with two parallel computers continues interrupted by a fault in one of the word memories. The coordination, however, is limited to a single word if only the faulty memory element is replaced by a standby element, while the non-faulty element groups are unaffected.

It has hitherto been assumed that a bit index is registered in the bit index register BR when a faulty memory element has been identified in order, by means of a writing gate and a reversing switch, to replace this faulty element by a standby element. If during the normal work of the computer with a faultfree word memory an arbitrary bit index is registered in the bit index register, faultfree digital words are read to the word register even if, according to the above, the binary bits defined by said arbitrary bit index are read from the standby elements. In the memory device according to the invention, therefore, bit indexes can be registered also for supervision of a faultfree word memory, the outputs of the bit index decoder BA activating their respective control gates G51, G52 . . G5*n* which, in activated state, connect the output wire of the respective memory element E1, E2 . . E*n* to a first input of a supervisory device ÖV, a second input of which is connected to the standby output wire UL*r*. The supervisory device, which consists for example of an EXCLUSIVE-OR gate EO, feeds from its output an alarm signal to the control unit SE of the computer if the binary bits transmitted to its inputs differ. The object of this supervision is chiefly to check that the memory device is prepared to carry out a reversing switching operation as above caused by a faulty element.

If, however, the memory device is furnished with the aforesaid bit index memory BM, so that a bit index is registered for every word address, the normal work of the computer is not disturbed if, for supervisory purposes, the bit index allotted to an element group is changed in conjunction with every writing into that element group. One obtains in this way an intensive internal supervision al all memory elements. If supervisory device ÖV alerts the computer, before the respective fault causes a stoppage of the two computers working in parallel, that the memory element has become faulty which is defined through the bit index registered at the time of the alarm, the supervision of the respective element groups is stopped and the bit index is retained in the bit index memory under the respective bit index address so that the faulty element, during continued work of the computer, is no longer connected to the word register OR for reading.

In the drawing arrows pointing from the bit index register BR and the bit index address register BAR indicate that at the time of alarm the respective registrations can be used as check data in the computer, for example for the fault tracing programme referred to earlier. The drawing shows a blocking device G6 which, in unactivated state, is arranged to prevent the issue of an alarm signal from the supervisory device ÖV. For, if a faulty memory element has been traced either by means of the internal supervision of the memory device or by a test programme for fault tracing, and if the faulty memory element according to the invention has been replaced by a standby element, in the absence of such blocking device an alarm signal would be issued on every reading from the respective element group. The blocking device G6 is most simply designed as an AND gate, one input of which is connected to the output of the EXCLUSIVE-OR gate EO and an indication signal in binary form is fed to its second input through the control unit SE of the computer. The drawing shows an inverting second input of the blocking device G6, a binary 0 and 1 fed to this input indicating, respectively, that the memory device is supervised and has at least one faulty memory element.

If for any reason it is undesirable, in the supervisory state of the memory device, that the binary bit defined by bit index *b*1, *b*2 . . *bn* registered in the bit index register BR is read out from a standby element, blocking gates G41, G42 . . G4*n* can be used. Each of these gates, in the order of sequence of the bit indexes, have their first inputs and outputs connected, respectively, to the bit index decoder BA and to the control input of one of the reversing switches OK1, OK2 . . OK*n* and their second inputs connected to a common signal circuit SL on which said indication signal is transmitted in binary form via elements RS from the control unit SE of the computer. In a supervisory state indicated by a binary 0 all reversing switches thus remain in rest position, so that the binary bits read from the standby elements are not transmitted to one of the registering elements R1, R2 . . R*n* of the word register but only to the supervisory device ÖV.

It is advisable to arrange in the bit index register BR 15 a signal registration element RS in order, through the control unit of the computer, to record said indication signals simultaneously with a bit index. The registration element RS is connected to the control input of the blocking device and to the common signal lead SL of the blocking gates. If the memory device is furnished with a bit index memory, the latter contains for every bit index address a memory element ES for storage of said indication signals combined with the bit indexes, so that the check of faultfree element groups continues while faulty memory elements are replaced by standby elements on simultaneous blocking of the alarm signal from the supervisory device.

We claim:

1. In combination with a computer which has a memory having memory elements for storing words wherein each word is a coded combination of bits in bit positional index order and each word is stored in an addressable word group of the memory elements, each memory element storing a particular positional bit of a word, a word register for receiving a word from an addressed word group of the memory or transferring a word to an addressed word group of the memory, a word address register for receiving the address of the word group, a source of word addresses, a transfer means for transferring word addresses from the source of word addresses to the word address register, and a control unit for controlling the transfer means, and the control unit including means for transmitting control signals to the memory for indicating the direction of transfer of a word between the word register and the word group indicated by the contents of the word address register, standby memory apparatus comprising a plurality of input channel means and a plurality of output channel means, means for connecting each of said input and output channel means between a bit position of the word register and a corresponding bit position element of an addressed word group, at least one standby memory element for at least some of the word groups of the memory, a plurality of controllable writing gate means each having a control input, an information input connected to one of said input channel means and an information output connected to said standby memory element of an addressed word group, each of said controllable writing gate means connecting its information input to its information output upon receipt of a control signal at its control input, a plurality of reversing switch means, each of said reversing switch means being interposed in one of said output channels, each of said reversing switch means having a first information bit input connected to receive a particular positional bit from an addressed word group, a second information bit input for receiving the bit stored in the standby memory element of the addressed word group, an information bit output connected to the associated bit position of the word register, and a reversing control input means for receiving a control signal, each of said reversing switch means including means operative in the absence of such control signal at said reversing control input means for connecting said first information bit input to said information bit output and in the presence of such control signal for connecting said second information bit input to said information bit output, a bit index storage means for transmitting a control signal to the associated control input of the controllable writing gate means and the associated control input means of the reversing switch means in accordance with the bit position stored therein, and said control unit including means for transferring to said bit index storage means a representation of the desired bit position.

2. The combination of claim 1 wherein said bit index storage means comprises a bit index register means for transmitting the control signals, a bit index memory having a plurality of addressable storage positions for storing representations of desired bit positions, means for transferring said representations between said bit index register means and an addressed storage position, a bit index address register means for selecting a storage position in accordance with the representation of the address stored in said bit index address register means, and the control unit including means for transferring representations of bit index addresses to said bit index address register means.

3. The combination of claim 1 further comprising a plurality of control gates each associated with a different bit position of a word and having a first input, a control input connected to receive the associated bit position control signal from said bit index storage means and an output, means for connecting said first input to the associated memory element of an addressed word group, supervisory means having first and second input terminals and an output terminal for giving an alarm when the information at said first and second input terminals does not have a given relationship, means for connecting said first input terminal to the outputs of all of said control gates and means for connecting said second input terminal to the standby memory element associated with an addressed word group.

4. The combination of claim 3 further comprising override means responsive to a further control signal for preventing the giving of an alarm by said output supervisory means, and means for generating said further control signal.

5. The combination of claim 4 wherein the means for generating such further control signal comprises memory elements which are loaded by the control unit of the computer.

* * * * *